United States Patent [19]

Pickett et al.

[11] Patent Number: 4,497,706
[45] Date of Patent: Feb. 5, 1985

[54] OIL FILTER RELIEF VALVE

[75] Inventors: Charles G. Pickett, North Plainfield; John G. Charney, Colonia; Marra Khasin, Rahway, all of N.J.

[73] Assignee: Purolator Inc., New Brunswick, N.J.

[21] Appl. No.: 547,960

[22] Filed: Nov. 2, 1983

[51] Int. Cl.³ .............................................. B01D 27/10
[52] U.S. Cl. .................... 210/130; 210/168; 210/440; 210/443; 210/455; 210/DIG. 17
[58] Field of Search ............... 210/130, 132, 133, 168, 210/440, 443, 455, 136, DIG. 17

[56] References Cited

U.S. PATENT DOCUMENTS

| | | | |
|---|---|---|---|
| 2,439,936 | 4/1948 | Kasten | 210/130 |
| 2,734,636 | 2/1956 | Foster | 210/164 |
| 2,888,141 | 5/1959 | Coates et al. | 210/440 |
| 2,995,249 | 8/1961 | Boewe et al. | 210/130 |
| 3,061,101 | 10/1962 | Humbert | 210/130 |
| 3,146,194 | 8/1964 | Hathaway | 210/130 |
| 3,156,259 | 10/1964 | Havelka | 210/130 |
| 3,187,896 | 6/1965 | Wilkinson | 210/130 |
| 3,221,880 | 12/1965 | Wilkenson | 210/130 |
| 3,231,089 | 1/1966 | Thornton | 210/130 |
| 3,272,342 | 9/1966 | McLaren et al. | 210/440 |
| 3,315,809 | 4/1967 | Hultgren | 210/130 |
| 3,369,666 | 2/1968 | Hultgren et al. | 210/130 |
| 3,473,664 | 10/1969 | Hultgren | 210/130 |
| 3,529,722 | 9/1970 | Humbert, Jr. | 210/130 |
| 3,586,171 | 6/1971 | Offer | 210/136 |
| 3,589,517 | 6/1971 | Palmai | 210/130 |
| 3,608,724 | 9/1971 | Baldwin | 210/130 |
| 3,618,775 | 11/1971 | Hultgren | 210/130 |
| 3,633,750 | 1/1972 | Braun et al. | 210/130 |
| 3,640,390 | 2/1972 | Goy | 210/130 |
| 3,669,144 | 6/1972 | Palmai | 210/130 |
| 3,695,437 | 10/1972 | Shaltis | 210/136 |
| 3,724,665 | 4/1973 | Hall | 210/130 |
| 3,928,201 | 12/1975 | Junck | 210/132 |
| 4,028,243 | 6/1977 | Offer | 210/130 |
| 4,045,349 | 8/1977 | Humbert, Jr. | 210/232 |
| 4,144,168 | 3/1979 | Thornton | 210/130 |

Primary Examiner—Ernest G. Therkorn
Attorney, Agent, or Firm—Staas & Halsey

[57] ABSTRACT

An oil filter relief valve having a tension spring housing with oil inlets and a first end and a second end, the first end being located adjacent the mounting plate of the filter, a base being fixedly connected to the second end of the spring housing and tension abutting and extending into the centertube of the filter element, a valve seat having a pointed surface and being located in the base with a channel formed therein for conducting oil therethrough, a resilient piston normally abutting the valve seat in sealing relation, a relatively rigid piston support on the piston, and a tension spring positioned between the first end of the tension spring housing and the piston support to urge the piston into sealing relation against the valve seat. This relief valve opens when the pressure of the oil entering the oil inlets and the channel in the valve seat exceed a particular threshold amount, thus exerting a force on the piston greater than the downward force naturally exerted by the spring. The piston is then lifted from the valve seat and the oil is allowed to flow through the relief valve and by-pass the filter element to immediately re-enter the motor.

16 Claims, 6 Drawing Figures

OIL FILTER RELIEF VALVE

BACKGROUND OF THE INVENTION

This invention relates generally to improvements in fluid filters, and more particularly to a relief valve for a motor vehicle oil filter.

A spin-on, throw-away type of fluid filter is now commonly used as an oil filter for motor vehicles because it is relatively inexpensive to mass produce and easy to install and replace. Presently, research and development regarding throwaway filters is directed to producing the filters less expensively, while maintaining or improving the filter's efficiency.

A spin-on, throw-away filter usually has, among other things, a filter housing with an open end covered partially by a mounting plate having a plurality of pores to allow oil to flow from the motor to the inside of the filter and a threaded central aperture for connecting the filter to the motor and transmitting oil from the inside of the filter back to the motor, a closed or domed end, a cylindrical filter element extending substantially from the open end to the closed end and being spring biased toward the open end but being spaced a certain distance from the open end, a centertube extending longitudinally at the interior of the filter element, and a relief valve having "open" and "closed" positions and being located between the open end and the filter element.

Under normal operating conditions, oil flows from the motor, through the mounting plate pores, through the filter element, through the closed relief valve, out the threaded central aperture and back to the motor.

Under abnormal operating conditions, i.e., when the filter element reaches its maximum dirt holding capacity or high pressure surges are experienced, such as cold starts of the motor, the relief valve is caused to open and immediately returns oil to the motor to assure sufficient oil reaches motor parts requiring lubrication, thus by-passing the filter element altogether.

Basically, two types of fluid filter relief valves are known in the art. The first type is the "tension spring housing" type and the second type is the "capturing legs" type. Each of these types of relief valve will now be generally described.

The tension spring housing type of relief valve usually comprises an outlet neck or member abutting the inside of the mounting plate of the filter and extending to adjacent the filter element, a cup-shaped tension spring housing which normally functions as the relief valve oil inlet member and which is fixedly connected to and extending from the outlet neck toward the closed end of the filter and into the filter element, and a spring-biased, relatively flat piston therebetween. The outlet neck functions as the sealing surface for the piston.

Examples of prior art tension spring housing type relief valves for fluid filters include:

| U.S. PAT. NO. | INVENTOR | ISSUED |
| --- | --- | --- |
| 3,061,101 | HUMBERT, JR. | 10/30/62 |
| 3,146,194 | HATHAWAY | 8/25/64 |
| 3,187,896 | WILKINSON | 6/8/65 |
| 3,315,809 | HULTGREN | 4/25/67 |
| 3,473,664 | HULTGREN | 10/21/69 |
| 3,618,775 | HULTGREN | 11/9/71 |
| 3,633,750 | BRAUN ET AL. | 1/11/72 |
| 3,640,390 | GOY ET AL. | 2/8/72 |
| 3,724,665 | HALL | 4/3/73 |

In the tension spring housing type, both the tension spring housing and the outlet neck are usually "deep drawn". Deep drawing is a relatively expensive manufacturing method for forming large depth/diameter ratios in sheet or strip metal by considerable plastic distortion in dies. In practice, cupshaped, box-shaped or cone-shaped articles or shells are produced by forcing a drawable metal into a punch press or drop hammer. From a manufacturing cost standpoint, it is desirous to hold drawn members to a minimum depth or to use as few deep drawn members as possible.

The outlet neck is deep drawn because it is necessary to keep the filter element in spaced relation to the mounting plate for proper operation of the filter. The inlet member is deep drawn in order to house the coil spring.

The deep drawn outlet neck of the tension spring housing type relief valve functions as a relatively flat sealing surface for receiving the piston in sealing relation. This design results in several drawbacks from a valve efficiency and manufacturing cost standpoint. More specifically, when the filter is assembled, a vertical force is created in the direction of the mounting plate by a spring at the dome end of the filter assembly which urges the filter element toward the open end of the filter. Of course, the filter element transfers this force through the relief valve upon which it rests. The deep drawn outlet neck is eventually required to support this vertical force. Since the flat sealing surface of the outlet neck is positioned perpendicular to this vertical force, any deformation of the outlet neck caused by the vertical force, e.g., bending or collapsing of its walls, results in the sealing surface becoming non-parallel to the relatively flat piston and leakage occurs through the relief valve at pressures far below the pressure required to open the valve. In effect, the relief valve by-passes oil at times when all of the oil should be flowing through the filter element.

Due to the possibility that the outlet neck will collapse or bend under the vertical force, it is necessary to manufacture the outlet neck from a material whose thickness can withstand the vertical force after assembly and thus keep the flat sealing surface parallel to the piston, i.e., perpendicular to the vertical force. Of course, a design requiring a thicker metal for the outlet neck will increase manufacturing costs, and attempting to deep draw this thicker metal will also increase costs.

Further, the tension spring relief valve of the prior art uses a soft rubber piston to seal against the sealing surface of the outlet neck. Restricting an oil filter design solely to soft rubber may also increase manufacturing costs. In addition, it is generally known that a flat, soft rubber piston resting against a flat sealing surface does not offer a dependable seal when used in an oil filter.

In summary, the above-discussed tension spring housing relief valve demands expensive manufacturing because deep drawing is more costly than holding drawn parts to a minimum depth or using as few deep drawn parts as possible. In addition, deep drawn outlet necks usually use a flat sealing surface which may cause leakage if the outlet neck collapses under pressure.

The second type of relief valve, i.e., the capturing legs type, usually uses a long molded nylon valve having at one end a plurality of hooked legs for capturing and holding a spring and at the other end a deeply formed outlet neck. Like the tension spring housing type, the oil outlet neck or member of the capturing legs type is positioned at the open end of the filter and is deeply formed in order to properly space the filter element from the mounting plate. The capturing legs extend toward the closed end and are necessarily long in order to receive and hold the coil spring. Finally, the capturing legs relief valve comprises a relatively flat piston between the spring and outlet neck for sealing the relief valve while in the closed position.

Examples of prior art capturing legs type relief valves for fluid filters include:

| U.S. PAT. NO. | INVENTOR | ISSUED |
|---|---|---|
| 3,156,259 | HAVELKA ET AL. | 11/10/64 |
| 3,589,517 | PALMAI | 6/29/71 |
| 4,028,243 | OFFER ET AL. | 6/7/77 |

The outlet neck of the capturing legs type of relief valve also functions as the sealing surface for the piston, as does the outlet neck of the tension spring housing type relief valve. Again, this design has several drawbacks from a valve efficiency and manufacturing cost standpoint. More specifically, when a filter using a capturing legs type relief valve is assembled, a vertical force is still created in the direction of the mounting plate by a spring at the dome end of the filter assembly, which urges the filter element toward the open end of the filter. Of course, the filter element transfers the vertical force through the relief valve. The outlet neck is eventually required to support this vertical force. Since the relatively flat sealing surface of the outlet neck is positioned perpendicular to the vertical force, any loss of structural integrity under the vertical force results in the sealing surface becoming non-parallel to the piston and leakage occurs through the relief valve at pressures far below the pressure required to open the valve. In effect, the relief valve passes oil at times when all of the oil should be flowing through the filter element.

Since today's engines are made smaller to do the same amount of work that larger engines did a decade or more ago, these smaller engines run at higher temperatures. The molded nylon valve used in, for example, the Havelka U.S. Pat. No. 3,156,259 may, if the temperature of the oil exceeds the softening point of the nylon, lose its structural integrity causing the sealing surface to become non-parallel to the piston under the force mentioned and causing leakage around the piston.

In addition, as is similar to the tension spring housing type relief valve, the capturing legs type relief valve requires a soft rubber piston to seal against the relatively flat sealing surface of the outlet neck. Again, restricting the oil filter design to a particulr type of rubber may increase overall costs and a flat, soft rubber piston does not provide an adequate seal against a relatively flat sealing surface (although the Havelka U.S. Pat. No. 3,156,259 indicates the use of a metal piston, this patent in practice also requires a molded rubber piston with a standard metal piston support to effect the desired seal, as is evidenced by the U.S. Pat No. 3,589,517 and Offer et al. U.S. Pat No. 4,028,243, which utilize the basic design of the relief valve of the Havelka et al. U.S. Pat. No. 3,156,259 along with a rubber piston).

Finally, regarding the capturing legs type of relief valve, e.g., the Havelka et al. U.S. Pat. No. 3,156,259, a molded nylon valve costs far more than the electroplate tin or steel used to make the deep drawn tension spring housings and outlet necks.

Thus, in regard to the capturing legs type of relief valve, the use of a molded nylon member creates manufacturing costs higher than a relief valve employing electroplate tin or steel. In addition, if the temperature of the oil exceeds the softening point of the nylon, the capturing leg member can lose its structural integrity and can cause unwanted leakage through the relief valve.

In summary, each of the two prior art types of relief valve uses a deep outlet neck for spacing the filter element from the mounting plate and for functioning as the sealing surface for the piston, each uses a deep drawn or long inlet member for holding the coil spring, each uses a spring urging the piston against the outlet neck, and each is susceptable to structural deterioration under the vertical force exerted upon the relief valve once the filter is assembled.

Overall, it is desirous that a relief valve be capable of the lowest cost manufacture and be capable of efficient sealing properties. For example, a design which allows for use of a relatively shallow drawn, thin electroplate material has a cost advantage over a design which uses a deep drawn thick steel or molded nylon. In addition, having flexibility in choosing the piston materials and structural design thereof is preferred to being limited to a particular type and configuration of rubber. Finally, it is desirous that a valve be capable of relatively quick and easy automated assembly and require no welding, brazing, or soldering in assembly.

Thus, it can be seen that known prior art oil filter relief valves for spin-on, throw-away type oil filters continue to have manufacturing drawbacks. None of the known prior art devices have the novel features of the invention disclosed herein for eliminating such manufacturing drawbacks.

SUMMARY OF THE INVENTION

In light of the above-mentioned disadvantages in prior art relief valves, it is an object of the present invention to provide a relief valve having improved sealing and relief capability and being easier and more economical to manufacture and assemble.

It is another object of the present invention to provide a relief valve having members which are as shallow drawn as possible, and/or a relief valve using as few deep drawn members as possible.

It is another object of the present invention to provide a relief valve, wherein the outlet neck does not serve as the sealing surface for the piston.

It is another object of the present invention to provide a relief valve, wherein the tension spring housing functions as the outlet neck.

It is another object of the present invention to provide a relief valve wherein the outlet neck serves to both space the filter element from the mounting plate and house the coil spring, and wherein the inlet member does not have to be deep drawn.

It is another object of the present invention to provide a relief valve which is made of relatively thin electroplate steel and is fully supported against vertical force directed toward the mounting plate from the dome end of the filter.

It is another object of the present invention to provide a relief valve, wherein the sealing surface is pointed to improve sealing characteristics.

It is another object of the present invention to provide a relief valve capable of maintaining structural integrity at oil temperatures higher than the softening temperature of nylon.

It is another object of the present invention to provide a relief valve using low-cost piston materials such as rubber, paper or plastic.

It is another object of the present invention to provide a relief valve which can be automatically assembled and which requires only rolling the edges of one member of the valve over the edges of another member to complete assembly.

It is another object of the present invention to provide a relief valve which requires the least amount of space in the filter upon assembly.

It is another object of the present invention to provide a relief valve capable of fitting into various centertube diameters.

Finally, it is an object of the present invention to provide a relief valve whose sealing ability improves with time in the presence of hot oil.

Additional objects and advantages of the invention will be set forth in part in the description which follows and in part will be obvious from the description, or may be learned by practice of the invention. The objects and advantages of the invention may be realized and obtained by means of the instrumentalities and combinations particularly pointed out in the appended claims.

To achieve the foregoing objects and in accordance with the purpose of this invention, and as embodied and broadly described herein, the oil filter relief valve of the present invention comprises a tension spring housing having oil inlet ports and a first end and a second end, the first end being located adjacent a mounting plate of the filter (thus, functioning as the relief valve oil outlet member), a base being fixedly connected to the second end of the tension spring housing and abutting and extending into a centertube of a filter element (thus, functioning as the relief valve oil inlet member for oil entering the relief valve from the filter element), a valve seat having a pointed surface and being located in the base with a channel formed therein for conducting oil therethrough, a resilient piston normally abutting the valve seat in sealing relation, a relatively rigid piston support on the piston, and a tension spring positioned between the first end of the tension spring housing and the piston support to urge the piston into sealing relation against the pointed valve seat (thus, the piston does not seal directly against the oil outlet member, i.e., the tension spring housing, but is in spaced relation thereto).

This relief valve opens when the pressure of the oil entering the oil inlet ports and the channel in the valve seat exceed a particular threshold amount, thus exerting a force on the piston greater than the downward force naturally exerted by the spring. The piston is then lifted from the valve seat and the oil is allowed to flow through the relief valve and by-pass the filter element to immediately re-enter the motor.

Overall, this invention provides an economically manufactured relief valve because it uses relatively inexpensive electroplate material and rubber, and requires only inexpensive fabrication thereof, while providing effective sealing when the relief valve is in the closed position and effective by-pass when the relief valve is in the open position.

BRIEF DESCRIPTION OF THE DRAWINGS

For convenience in describing the preferred embodiments of the present invention in regard to the drawings included herein, the terms "downwardly" and "upwardly" are used; however, the use of these terms is not intended to be a limitation of the present invention.

DESCRIPTION OF THE PREFERRED EMBODIMENTS

Figure 1:
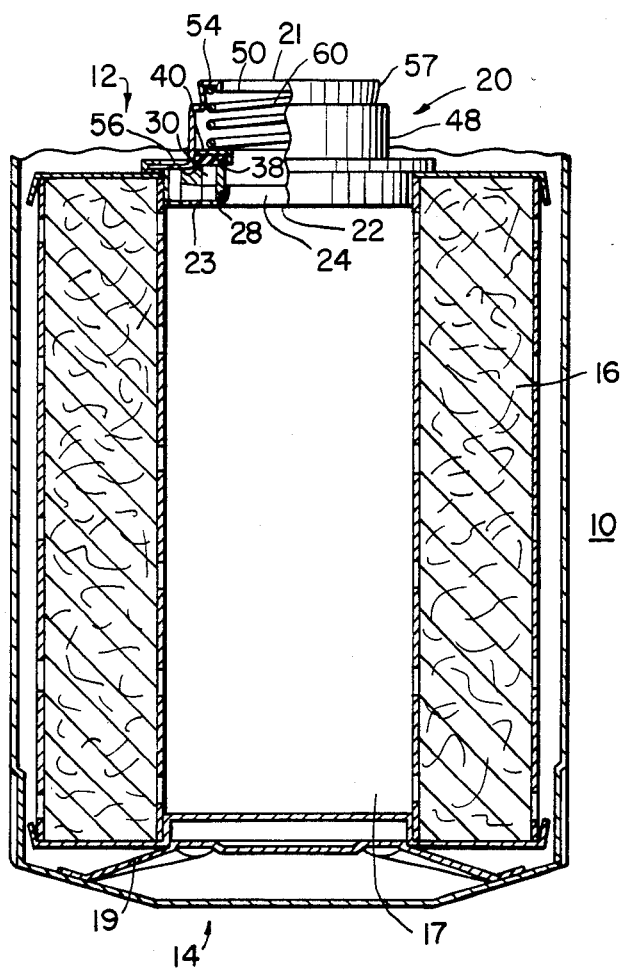
FIG. 1 is a partial cross-sectional view of the oil filter relief valve of the present invention positioned in a spin-on, throw-away type oil filter housing.

As shown in FIG. 1, the reference numeral 10 indicates an oil filter to be used with a motor (not shown). The filter has an open end 12 which usually is partially covered by a mounting plate and a closed or domed end 14. The mounting plate has a threaded central aperture (not shown) which is used to screw the spin-on oil filter 10 onto the motor. Internally of the filter 10 is a cylindrical filter element 16 being spaced from the mounting plate a predetermined distance and extending substantially to the closed end 14 of the filter 10. A centertube 17 is located longitudinally of the filter element 16 at the interior thereof.

In addition, spring means, such as a leaf spring 19, is positioned between the domed end 14 and the filter element 16 to urge the filter element 16 toward the open end 12 of the filter 10.

Figure 2:
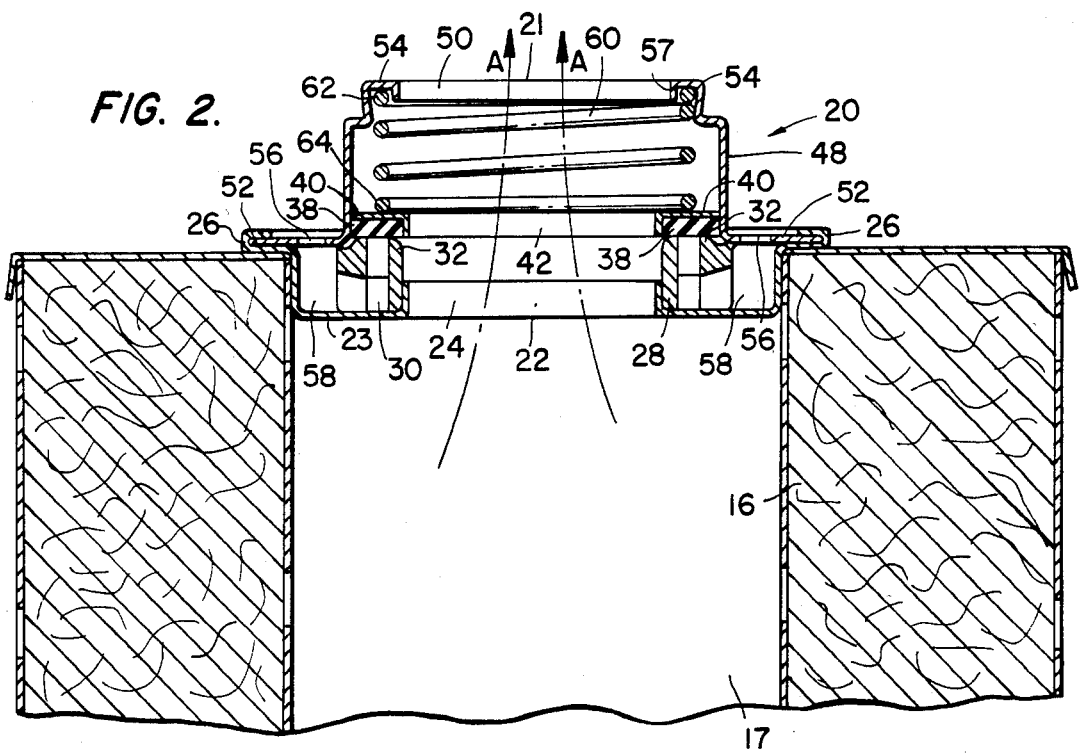
FIG. 2 is an enlarged cross-sectional view of the oil filter relief valve of the present invention, illustrating particularly the position of the oil filter relief valve while in the "closed" position for allowing oil to flow through the filter element under normal conditions.
Figure 3:
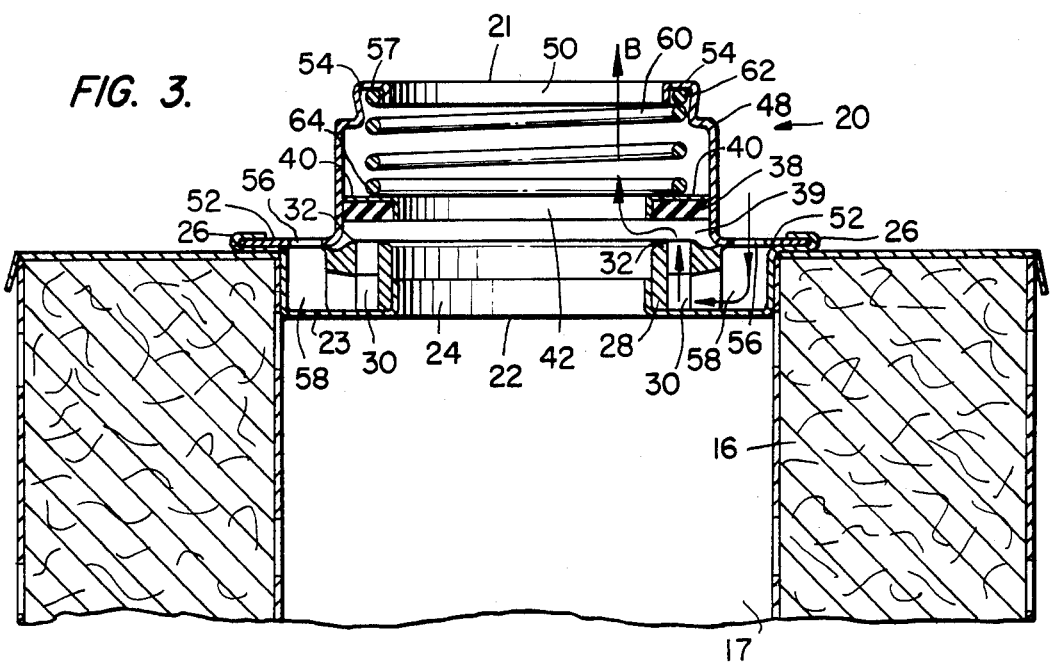
FIG. 3 is an enlarged cross-sectional view of the oil filter relief valve of the present invention in the "open" position for allowing oil to by-pass the filter element and return to the motor immediately.

As is best seen in FIGS. 1-3, the relief valve 20 of the present invention is located near the open end 12 of the filter 10. The relief valve 20 has a first end 21 and a second end 22. More particularly, the relief valve 20 has a base 23 which has an opening 24 therein for allowing oil to flow from the filter element 16 into the relief valve 20. The outer ends 26 of the base 23 are positioned on the top of the filter element 16. The relief valve 20 also has a housing 48 mounted near the mounting plate of the filter; the position previously held by the deep drawn outlet neck of the prior art relief valves.

As stated above, all prior art relief valves have deeply formed outlet necks needed to space the filter element from the mounting plate. In addition, all prior art relief valves necessarily have long or deep inlet members for housing the spring. In contrast, in the preferred embodiment of the present invention, the outlet neck (the spring housing) may be deep drawn to serve as both a means for spacing the filter element from the mounting plate and a means for housing the spring. Accordingly, the inlet neck (base) does not have to also be deep drawn as in the prior art.

More particularly, the base 23 is a shallow drawn member and the tension spring housing 48 may either be deep drawn or more shallow drawn than the tension spring housings of the prior art relief valves. In either case, the present invention is capable of holding drawn parts to a minimum depth or of restricting the number of deep drawn parts to one, i.e., only the tension spring housing 48 is deep drawn and not the base 23.

Located within the base 23 is a valve seat 28 which has an annular configuration and is positioned around the opening 24 in the base 23. The valve seat can be manufactured from any suitable material compatible chemically with hot oil having a temperature up to 400° F. The valve seat 28 comprises an angled oil flow channel 30 which transmits oil entering the filter 10 directly back to the motor when the relief valve is open, thus by-passing the filter element 16. The valve seat 28 terminates at one end in sealing lips or surfaces 32. The sealing lips or surfaces 32 are generally pointed or semi-sharp. The pointed or semi-sharp sealing surfaces 32 of the valve seat 28 create a tighter and more dependable seal than the flat soft rubber pistons urged against the outlet necks of the prior art relief valves. It is preferable that the sealing surface 32 be as sharp as possible which allows for use of many types of materials for the valve seat 28, some of which are relatively inexpensive. Even if an expensive molded nylon valve seat 28 is used, since the only force exerted upon the nylon would be the force of spring 60, to be discussed more fully hereafter, much higher oil temperatures above the softening temperature of nylon can be tolerated.

The relief valve 20 also includes a piston 38 which is an annular member that can be produced, e.g., from rubber, plastics, or paper by molding or lathe cutting. The piston 38 may be partially covered by a piston support 40 which is also an annular member. The piston support 40 also has an opening 42 therein to allow oil to continue in its path from the opening 24 in the base 23 through the oil filter relief valve 20.

Generally, the base 23, the tension spring housing 48, the piston 38 and/or the support 40 can be formed, molded or machined from metal or another relatively rigid material. For example, the present invention's improved sealing surface 32 allows the piston 38 to be made of a low cost material such as rubber impregnated paper which is stamped at assembly.

The tension spring housing 48 of the relief valve 20 comprises an opening 50 therein for further allowing oil to pass through the relief valve 20. The tension spring housing 48 has lower ends 52 which abut the ends 26 of the base 23, and upper ends 54 which form an annular collar 57 for receiving a spring 60.

The tension spring housing 48 also contains oil inlet ports 56 near the lower ends 52 of the tension spring housing 48. These oil inlet ports 56 allow oil that has passed through the pores in the mounting plate to enter an area 58 formed between the ends 26 of the base 23 and the valve seat 28.

A spring 60 is positioned within the tension spring housing 48. The spring 60 has a first end 62 which is received by the collar 57 and a second end 64 which abuts the piston support 40. The spring 60 normally urges the piston support 40 and piston 38 into sealing relation against the sealing lips or surfaces 32 of the valve seat 28.

To assemble the relief valve 20, the ends 26 of the base 23 are merely rolled over the ends 52 of the tension spring housing 48. Thus, the relief valve 20 of the present invention can be easily assembled and requires no welding, brazing or soldering as does some of the prior art devices. In addition, assembly can be easily and quickly performed by automated machinery.

In light of the above discussion, it is apparent that in the present invention the "outlet neck" (tension spring housing) does not serve as the sealing surface for the piston. Accordingly, the sealing quality of the relief valve of the present invention is not dependent upon the ability of the outlet neck to maintain its structural integrity against the vertical force exerted in the assembled filter. Nevertheless, the outlet neck of the relief valve of the present invention is fully supported against this vertical force exerted toward the open end.

The practical effect of the present invention is that 0.010 inch thick electroplate steel can be used to fabricate the relief valve, whereas the prior art filters using deep drawn outlet necks to withstand the vertical force require a minimum of 0.035 inch thick electroplate steel. Of course, thicker steel is more costly to buy and to fabricate.

Overall, as seen in FIG. 2 the oil flow under normal conditions is as follows: oil leaves the motor and passes through the oil inlet pores in the filter mounting plate (not shown); with the relief valve 20 closed, oil moves along the outside of the filter (not shown) and enters the filter element 16 (some oil enters oil inlets 56 and channel 30 but not enough pressure is exerted at this time to overcome the force of the spring 60 and cause the piston 38 to move); the oil leaves the filter element 16 and enters the centertube 17 upon which it flows through openings 24, 42, and 50 in the relief valve 20 (as shown by arrows "A" in FIG. 2); and finally, the oil returns through the threaded central aperture 14 to the motor.

As best seen in FIG. 3, under abnormal conditions, i.e., when the filter element 16 reaches its maximum dirt holding capacity or high pressure surges are experienced, such as cold starts of an engine, the relief valve 20 is caused to open and oil entering the filter 10 from the motor is immediately returned to the motor, thus bypassing the filter element 16.

More particularly, when oil has difficulty passing through the filter element 16 due to being saturated with dirt, or when the motor is started and pressure is increased by the immediate surge of oil into the filter 10, the oil passing through the oil inlet ports 56, area 58 and channel 30 increases in pressure and exerts this increased pressure against the piston 38. If the pressure exceeds a particular threshold, i.e., the normal force exerted by the spring 60 upon the piston support 40 and the piston 38, the piston and the piston support 40 are moved toward the open end of the filter (not shown), and accordingly the spring 60 is partially compressed. After the piston 38 and piston support 40 move away from the valve seat 28, a space 39 is provided between the piston 38 and the valve seat 28 allowing the oil to move into the center of the relief valve 20, whereupon it moves out of the relief valve 20 and into the motor. The above-described flow of oil is represented in FIG. 3 for one side of the relief valve 20 by arrow "B".

If the pressure of the oil again returns to a level below the force normally exerted by the spring 60 upon the piston support 40, the spring 60 again urges the piston support 40 and piston 38 against the valve seat 28. Of course, the sealing lips or surfaces 32 of the valve seat 28 effectively seal the valve seat 28 against the piston 38 to prevent further flow of oil through the relief valve 20 until the time comes that the oil pressure is again greater than the force normally exerted by the spring 60 upon the piston support 40 and the piston 38.

It has been found through testing of the relief valve 20 of the present invention that the sealing virtues of this relief valve increase with time in hot oil. More particularly, after 500 hours at 300° F., the relief valve 20 tends to instantaneously open at the desired pressure, whereas the relief valves known in the prior art tend to open slowly as the pressure is increased.

Figure 4:
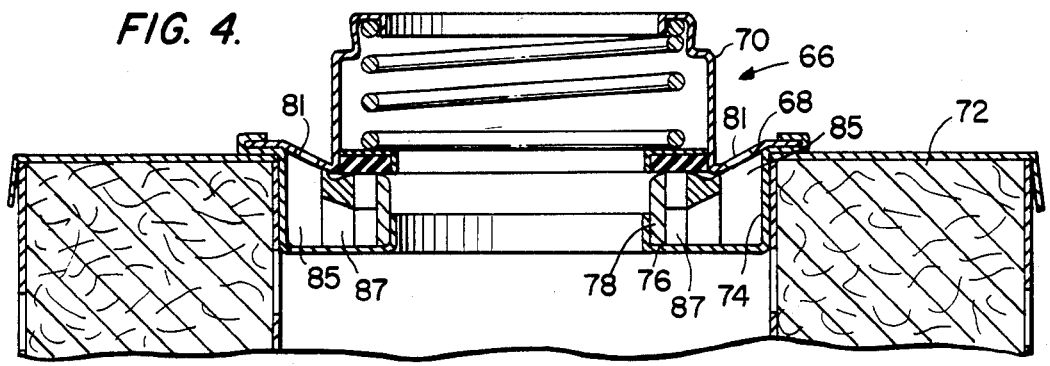
FIG. 4 is an enlarged cross-sectional view of another embodiment of the oil filter relief valve of the present invention, illustrating particularly a structure which allows for a reduced overall height of the relief valve extending above the filter element.

FIG. 4 illustrates another embodiment of the relief valve of the present invention, wherein the base and the tension spring housing have been modified to allow for a reduced overall height of the relief valve extending above the filter element. This capability may be advantageous for particular applications of the filter.

More particularly, FIG. 4 illustrates a relief valve 66 wherein the wall 68 of the tension spring housing 70 is bent downwardly at an angle relative to the plane of the top of the filter element 72. In addition, side wall 74 of the base 76 is elongated to allow the valve seat 78 to be positioned downwardly and closer to the closed end of the filter (not shown). Finally, inlet ports 81 allow oil to flow from pores in the filter mounting plate (not shown) into the area 85 formed between the wall 74 and the valve seat 78 and finally into the channel 87.

Together, the modifications to walls 68 and 74 allow the relief valve 84 in its entirety to be positioned downwardly and closer to the closed end of the filter (not shown). These modifications allow for a reduced overall height of the relief valve 84 extending above the filter element 72, thus providing greater flexibility regarding other parameters for designing and manufacturing an oil filter.

Figure 5:
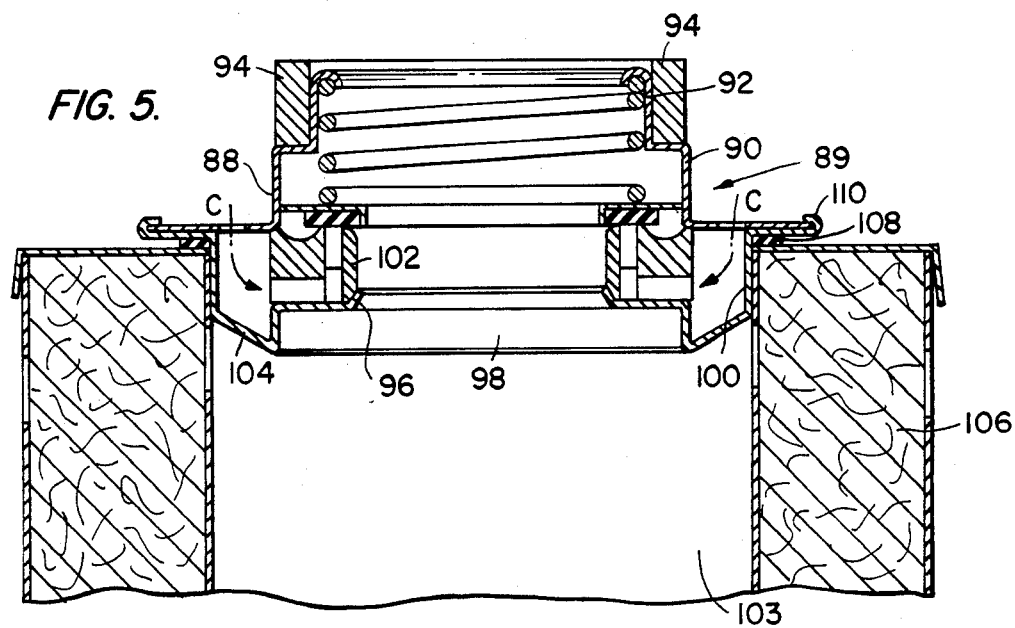
FIG. 5 is an enlarged cross-sectional view of another embodiment of the oil filter relief valve of the present invention, illustrating particularly a structure which can be used in either the upright position, as shown in FIG. 5 or in the inverted position as shown in FIG. 6.
Figure 6:
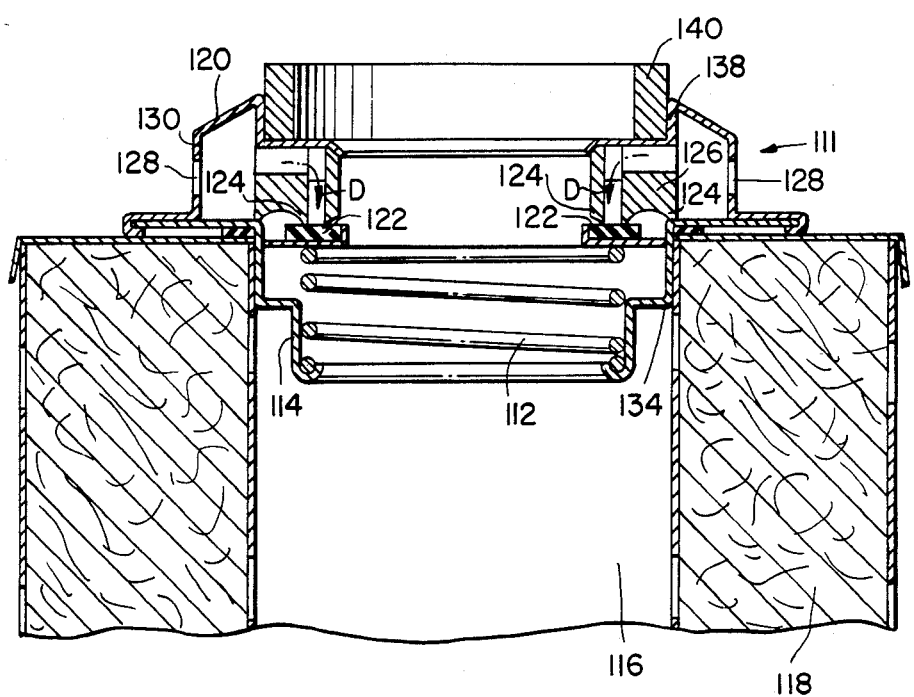
FIG. 6 is an enlarged cross-sectional view of another embodiment of the oil filter relief valve of the present invention, illustrating particularly an oil filter relief valve similar to the one shown in FIG. 5, but which is in an inverted position.

FIGS. 5 and 6 illustrate other embodiments of the oil filter relief valve of the present invention, i.e., a relief valve structure which can be used in either the upright position, or in the inverted position. The embodiments shown in FIGS. 5 and 6 are capable of fitting one of several different centertube diameters.

More particularly, FIG. 5 illustrates a relief valve 89 having a tension spring housing 88 with a wall 90 being modified to extend the upper ends 92 thereof to receive, e.g., a part of the filter mounting plate for example a gasket 94. In addition, wall 96 near the opening 98 in the base 100 is angled to receive a correspondingly angled bottom of the valve seat 102, and wall 104 being angled relative to the plane of the top of the filter element 106. This embodiment preferably fits, e.g., diameters of 1.6 to 1.8 inches for centertube 103. Finally, an annular ring gasket 108 is positioned between the ends 110 of the base 100 and the top of the filter element 106. With the relief valve 89 in the closed position, oil normally flows through the filter element 106 as described in relation to FIG. 2, while some oil enters the relief valve 89, as indicated by arrows "C" in FIG. 5.

The embodiment of the relief valve 111 shown in FIG. 6 is similar to that shown in FIG. 5, except that the relief valve 111 is inverted relative to the embodiment shown in FIG. 5. Although the spring 112 and tension spring housing 114 of relief valve 111 now take the approximate position of the spring and tension spring housing of the prior art, i.e., extending into the centertube 116 of the filter element 118, note that the base 120 of the relief valve 111 shown in FIG. 6 does not function as the sealing surface for the piston 122. Thus, even if the base 120 should become partially bent under the vertical force caused by assembly of the filter, the sealing lips or surfaces 124 of the valve seat 126 will be able to maintain an effective seal with the piston 122. The oil inlet ports 128 for this embodiment are positioned in the wall 130 of the base 120 and not in the wall 132 of the tension spring housing 114, as was seen in FIGS. 1-5. The wall 134 of the tension spring housing 114 may fit within various diameters for centertube 116. For example, the tension spring housing 114 preferably fits into a centertube 116 diameter of 1.225 to 1.550 inches. The wall 138 in the base 120 receives part of the filter mounting plate for example a gasket 140. With the relief valve 111 in the closed position, oil normally flows through the filter element 118, as described in relation to FIG. 2, while some oil enters the relief valve 111, as indicated by arrows "D" in FIG. 6.

It can be seen from the above description of the preferred embodiments that the present invention provides a relief valve which is less expensive to make and which provides more reliable sealing and relief properties than the prior art.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention and the appended claims and their equivalents.

We claim:

1. A fluid filter assembly comprising:
   (a) a filter housing having an open end and a closed end;
   (b) a filter element positioned in the filter housing and extending between the closed end of the filter housing and the open end of the filter housing; and
   (c) a relief valve in the fluid filter, the relief valve including
      (i) a housing having a first end a second end, the first end located adjacent the open end of the filter, and the second end having fluid inlet ports therein and extending toward the closed end of the filter;
      (ii) a base fixedly connected to the second end of the housing and extending into the area defined by the filter element;
      (iii) a piston positioned inside of the housing;
      (iv) an annular valve seat located in the base for normally receiving the piston in sealing relation, the valve seat having a continuous channel therein with one end being capable of fluid communication with the fluid inlet ports of the housing and the other end of the continuous channel opening from a surface of the valve seat toward the piston; and
      (v) a spring positioned in the housing between the first end of the housing and the piston for urging the piston toward the base and against the valve seat.

2. The relief valve of claim 1, wherein the base is made of metal and is shallow drawn relative to the housing.

3. The relief valve of claim 1, further comprising:
   a relatively rigid piston support positioned between the piston and spring.

4. The relief valve as recited in claim 3, wherein the piston is resilient relative to the piston support.

5. The relief valve as recited in claim 4, wherein the piston is made of rubber.

6. The relief valve as recited in claim 5, wherein the piston support is made of metal.

7. The relief valve as recited in claim 1, wherein the surface of the valve seat having the channel opening toward the piston is pointed.

8. The relief valve as recited in claim 1, wherein the filter element further comprises a centertube therein, and wherein the base is capable of fitting within centertube diameters in the range of 1.6 to 1.8 inches.

9. A fluid filter assembly comprising:
(a) a filter housing having an open end and a closed end;
(b) a filter element positioned in the filter housing and extending between the closed end of the filter housing and the open end of the filter housing; and
(c) a relief valve in the fluid filter, the relief valve including
(i) a housing having a first end and a second end, the first end abutting the filter element and the second end extending toward the filter open end;
(ii) a base being positioned adjacent the open end of the filter and being fixedly connected to the second end of the housing, the base having oil inlet ports therein;
(iii) a piston positioned inside of the housing;
(iv) an annular valve seat located in the base for normally receiving the piston means in sealing relation, the valve seat having a continuous channel therein with one end being capable of fluid communication with the oil inlet ports and the other end opening from a surface of the valve seat toward the piston; and
(v) a spring positioned in the housing between the first end of the housing and the piston for urging the piston toward but in spaced relation to the base and against the valve seat.

10. The relief valve of claim 9, wherein the base is made of metal and is shallow drawn relative to the housing.

11. The relief valve as recited in claim 9, further comprising:
a relatively rigid annular piston support positioned between the piston and the spring.

12. A relief valve as recited in claim 11, wherein the piston is resilient relative to the piston support.

13. The relief valve as recited in claim 12, wherein the piston is made of rubber.

14. The relief valve as recited in claim 13, wherein the piston support is made of metal.

15. The relief valve as recited in claim 9, wherein the surface of the valve seat having the channel opening toward the piston is pointed.

16. The relief valve as recited in claim 9, wherein the filter element further comprises a centertube therein, and wherein the housing is capable of fitting within centertube diameters in the range of 1.225 to 1.550 inches.

* * * * *

UNITED STATES PATENT AND TRADEMARK OFFICE
CERTIFICATE OF CORRECTION

PATENT NO. : 4,497,706

DATED : February 5, 1985

INVENTOR(S) : Pickett et al.

It is certified that error appears in the above-identified patent and that said Letters Patent is hereby corrected as shown below:

Col. 1
Line 12, "throwaway' s/b --throw-away--.

Col. 2
Line 6, "cupshaped" s/b --cup-shaped--.

Col. 3
Line 58, after "the" insert --Palmai--.

Col. 10
Line 38, after "end" (first occurrence) insert --and--.

Signed and Sealed this

Twenty-fifth Day of June 1985

[SEAL]

Attest:

DONALD J. QUIGG

*Attesting Officer*  *Acting Commissioner of Patents and Trademarks*